Sept. 30, 1958

L. K. HEDDING 2,854,609

RECTIFIER STACK ASSEMBLIES

Filed Jan. 26, 1955

INVENTOR.
Linnie K. Hedding
BY W. L. Stout

HIS ATTORNEY

United States Patent Office 2,854,609
Patented Sept. 30, 1958

2,854,609

RECTIFIER STACK ASSEMBLIES

Linnie K. Hedding, Wilkinsburg, Pa., assignor to Westinghouse Air Brake Company, Wilmerding, Pa., a corporation of Pennsylvania Application January 26, 1955, Serial No. 484,119

6 Claims. (Cl. 317—234)

My invention relates to rectifier stack assemblies, and particularly to a novel means for dissipating the heat generated by rectifier stack assemblies of the type in which the rectifier cells are stacked in an insulating tube provided with metal connections at the ends.

In rectifier stack assemblies of the type described, the cells tend to have a relatively poor thermal contact with the insulating tube, and this fact coupled with the poor heat transfer properties of the insulating material which comprises the tube causes the operating temperature of the cells to rise higher than is desirable. The life of the cells decreases with increases in operating temperatures, and unless a suitable means is provided for dissipating the heat it becomes necessary to operate the cells at a lower power rating than is desirable in the interest of economy.

It is therefore an object of my invention to provide a novel rectifier stack assembly of the type described capable of providing good heat conductivity and heat dissipation.

Another object of my invention is to provide a novel rectifier stack assembly and heat dissipating means that is simple in structure and inexpensive to manufacture.

Other objects, purposes and characteristic features of my invention will be in part obvious from the accompanying drawings and in part pointed out as a description of my invention progresses.

In practicing my invention I provide a rectifier stack assembly having a novel retaining tube for supporting the stack of rectifier cells. The novel tube is provided with spaces that are filled with a thermoplastic or thermosetting insulated compound which is capable of intimate contact with a substantial portion of the periphery of each of the rectifier cells. The thermoplastic filler provides intimate contact with the interior wall of the tube thus providing a large area for heat transfer through the medium of the thermoplastic.

In describing my invention in detail reference will be made to the accompanying drawings in which corresponding parts are generally identified by corresponding reference characters and in which.

Figure 2:
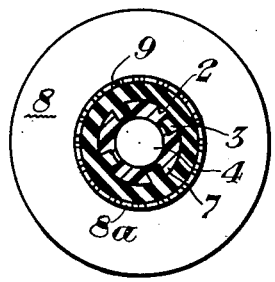
Fig. 2 is a cross sectional view taken along the line II—II of Fig. 1.
Figure 1:
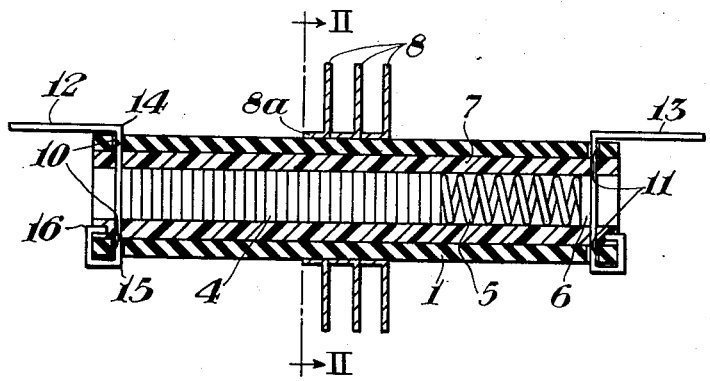
Fig. 1 is a longitudinal vertically sectioned view of one form of my novel rectifier stack assembly.
Figure 4:
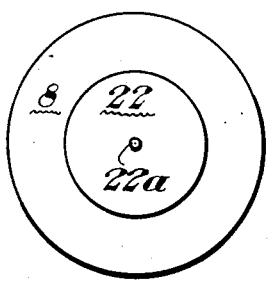
Fig. 4 is a end view showing one of the end sealing caps of Fig. 3.

Referring to the drawings, the rectifier stack assembly of Fig. 1 comprises a cylindrical tube 1 constructed of an insulating material, preferably one of the plastic resins group. The tube 1 is provided with internal longitudinally extending flutes or grooves 2 separated by inwardly projecting ridges 3 extending longitudinally along the internal length of the tube 1. Stacked within the central area defined by the inwardly projecting longitudinally extending ridges 3 is a plurality of rectifier cells 4. The number of rectifier cells 4 used in a particular rectifier assembly is a matter of choice depending upon the desired operating characteristics of the rectifier assembly In order to maintain the rectifier cells 4 within the tube 1, two transverse openings 10 and 11 are drilled in the insulating tube 1. One opening 10 is adjacent one end of the tube 1 while the other opening 11 is adjacent the other end of the tube 1. Inserted into the holes 10 and 11 are terminal wires 12 and 13, respectively. The wires 12 and 13 are constructed of good conducting material and are passed across the ends of the tube 1 in such a manner that the rectifier cells 4 are against one wire 12 while at the other end a washer member 6 of conducting material is in good contact with the wire 13. Located between the rectifier cells 4 and the washer 6 is a resilient conducting coil spring member 5. The spring member 5 serves to act as a pressure means for forcing each of the cells 4 into firm engagement with the previous cell and also to maintain the cells and washer in good contact with the electrical wires 12 and 13, respectively.

Located within the fluted openings 2 of the rectifier tube 1 is an insulating material 7, such as wax or thermoplastic or a thermosetting insulating compound. The insulating material 7 makes intimate contact with a substantial portion of the periphery of each of the cells 4 and is also in good contact with the interior surface of the tube 1. This insulating material 7 therefore acts as a medium of heat transfer between the cells 4 and the interior surface of the tube 1. The insulating material 7 makes contact with the coil spring 5 only along the periphery thereof and will thus not appreciably affect the inherent resiliency of the spring.

The wires 12 and 13 are secured within the openings 10 and 11, respectively, by bending the wires just beyond the outer surface of the tube 1. For example, the wire 12 is bent as at points 14 and 15 with the unused end 16 being bent around the end of the tubing 1 and inserted into the insulating material 7. This insures that the wires will remain in proper position and retain the cells 4 within the tube 1.

Spaced along the outer surface of the tube 1 is a plurality of metal heat dissipating fins 8. Each of the fins 8 is provided with a central opening therethrough of smaller diameter then the external diameter of the insulating tube 1. Each of the dissipating fins 8 is then split outwardly in a radial manner from the smaller internal opening, as at 9. The fingers 8a formed by the slits 9 of the heat dissipating fins 8 are then turns outwardly to form an enlarged opening approximately the diameter of the outside of the tube 1. Each of the heat dissipating fins 8 is then slipped over the external surface of the tube 1 and the fingers 8a are pressed firmly down against the outer surface of the tube providing a good heat transfer surface between the fins 8 and the outer surface of the tube 1. The fingers 8a of each of the fins further serve as a means for spacing the fins evenly along the length of the rectifier tube 1. It will be noted that for simplicity, only three heat dissipating fins 8 have been shown in place on the rectifier tube 1. It is pointed out however, that substantially the entire length of the tube 1 would generally be provided with heat dissipating fins such as the heat dissipating fins 8.

Figure 3:
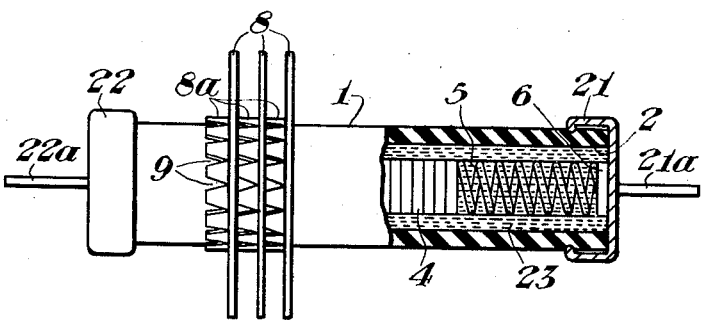
Fig. 3 is a partially sectioned side elevational view of another form of my novel rectifier stack assembly utilizing end sealing caps.

The modified form of my invention shown in Fig. 3 is similar to Fig. 1 with the exception that in this form the ends of the tube 1 are sealed, as by caps 21 and 22, and the fluting 2 along the interior of the rectifier tube 1 is filled with a liquid material, such as an oil 23, which then serves as a heat transfer means between the rectifier cells 4 and internal surface of the rectifier tube 1. It will be appreciated that the liquid oil will not appreciably affect the inherent resiliency of spring 5. The sealing end caps 21 and 22 are constructed of good conducting material and are each provided with electrical wires 21a and 22a, respectively. The tube 1 (of Fig. 3) is also provided with heat dissipating fins 8 such as those shown in Fig. 1.

Figure 6:
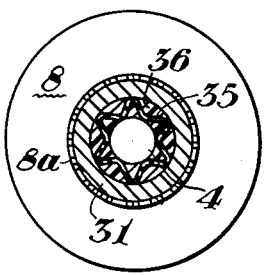
Fig. 6 is a cross sectional view taken substantially along the line V—V of Fig. 5.
Figure 5:
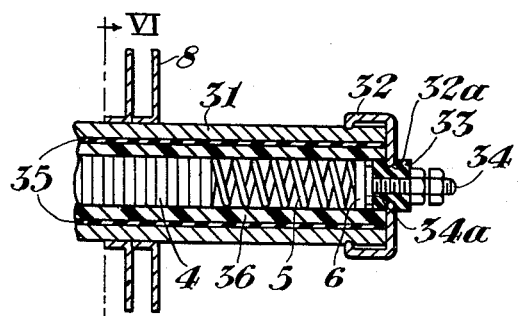
Fig. 5 is a partially sectioned front elevational view of another form of my novel rectifier stack assembly.

The form of invention shown in Fig. 5 and Fig. 6 utilizes a rectifier assembly tube 31 constructed of a metal. Located within the internal diameter of the metal tube 31 is a lining of corrugated insulating material 35. The corrugated insulating material 35 acts as a spacer for separating the metal tube 31 and the rectifier cells 4. Within the spaces formed by the corrugated insulating material 35, the interior surface of the metal tube 31 and the outer surface of the rectifier cells 4, is an insulating material 36 which may be a thermoplastic or a liquid.

The ends of the metal tube 31 are each sealed or capped by a metal cap provided with a central opening 32a (only one cap being shown in the drawing). The central opening 32a in each cap 32 is provided with an insulating bushing 33 having an opening therethrough for receiving a conducting bolt 34. As shown in the drawing the conducting bolt 34 is provided with an enlarged head 34a which is in firm electrical contact with the washer member 6. Located between the washer member 6 and the rectifier cells 4 is a coil pressure spring member 5 for holding the rectifier cells in firm engagement, as was indicated in the description of Fig. 1. The end of the rectifier assembly tube 31 which is not shown in the drawings is provided with a sealing cap identical to the cap shown in Fig. 5. The rectifier assembly tube 31 is also provided with heat dissipating fins 8 as described in connection with Fig. 1.

The structure shown in Fig. 5 provides excellent transfer of the heat generated by the cells 4 since the metal tube has negligible temperature rise in transferring heat to the surrounding medium and to the cooperating fins 8.

The rectifier assemblies of my invention have the advantages of good heat dissipation and low manufacturing expenses.

Although I have herein shown and described only a few forms of rectifier stack assemblies embodying my invention it is to be understood that various changes and modifications may be made therein within the scope of the appended claims without departing from the spirit and scope of my invention.

Having thus described my invention what I claim is:

1. A rectifier assembly comprising an internally fluted insulated tube, rectifier cells within said tube, electrical terminal means for maintaining said rectifier cells within said tube, spring means within said tube for holding said rectifier cells under compression and in firm electrical contact with said terminal means, and thermosetting electrically insulating means located within the fluting of said tube and in intimate contact with the rectifier cells for transferring the heat of the rectifier cells to said tube.

2. A rectifier assembly comprising an internally fluted insulated tube, rectifier cells within said tube, metallic terminal caps secured to each end of said tube for maintaining said rectifier cells within said tube, spring means within the tube for holding said rectifier cells under compression and in firm contact with said metallic terminal caps, and a nonelectrical conducting liquid means for filling the areas formed by said fluting and the area between the rectifier cells and said tube for the transfer or rectifier cell heat to the walls of said tube.

3. A rectifier assembly comprising an internally fluted insulated tube, rectifier cells within said tube, metallic terminal caps secured to each end of said tube for maintaining said rectifier cells within said tube, spring means within the tube for holding said rectifier cells under compression and in firm contact with said metallic terminal caps, and a nonelectrical conducting liquid means for filling the area formed by said fluting and the area between the rectifier cells and said tube for the transfer of rectifier cell heat to the walls of said tube and heat dissipating fins located about said tube for distributing the rectifier cell generated heat to the surrounding air.

4. A rectifier assembly comprising a metallic tube, a corrugated insulating spacer extending the length of the internal surface of the tube, rectifier cells located within the inner limits of the corrugated insulating spacer, metallic caps secured to each end of said metallic tube, insulating bushings located within an opening in each metallic cap, terminal means located within said bushings and in electrical contact with said rectifier cells, spring means within the inner limits of said spacer for holding said rectifier cells under compression and in good electrical contact with said terminal means, and thermosetting insulating means located in good contact with said rectifier cells and within the spaces formed by said insulating spacer for transferring rectifier cell heat to said metal tube.

5. A rectifier assembly comprising a metallic tube, a corrugated insulating spacer extending the length of the internal surface of the tube, rectifier cells located within the inner limits of the corrugated insulating spacer, metallic caps secured to each end of said metallic tube, insulating bushings located within an opening in each metallic cap, terminal means located within said bushings and in electrical contact with said rectifier cells, spring means within the inner limits of said spacer for holding said rectifier cells under compression and in good electrical contact with said terminal means, thermosetting insulating means located in good contact with said rectifier cells and within the spaces formed by said insulating spacer for transferring rectifier cell heat to said metal tube and heat dissipating fins located about said tube for dissipating rectifier cell and tube heat to the surrounding air.

6. A rectifier assembly comprising an internally fluted insulated tube, rectifier cells within said tube, electrical terminal means for maintaining said rectifier cells within said tube, spring means within said tube for holding said rectifier cells under compression and in firm electrical contact with said terminal means, electrically insulating thermo means located within the fluting of said tube and in intimate contact with the rectifier cells for transferring the heat of the rectifier cells to said tube, and heat dissipating fins located about said tube for dissipating rectifier assembly generated heat to the surrounding air.

References Cited in the file of this patent

UNITED STATES PATENTS

| | | |
|---|---|---|
| 2,444,880 | Robinson | July 6, 1948 |
| 2,454,846 | Skinker | Nov. 30, 1948 |
| 2,498,666 | Escoffery et al. | Feb. 28, 1950 |
| 2,634,314 | Netherwood | Apr. 7, 1953 |
| 2,674,646 | Schoch | Apr. 6, 1954 |
| 2,699,521 | Weiss | Jan. 11, 1955 |
| 2,780,758 | Zetwo | Feb. 5, 1957 |